June 12, 1956 L. H. MORIN 2,750,129
MOLDED PLASTIC SPOOL
Filed June 22, 1953
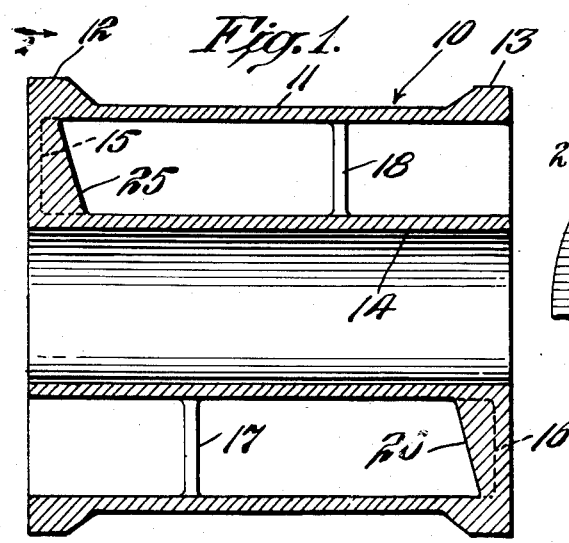
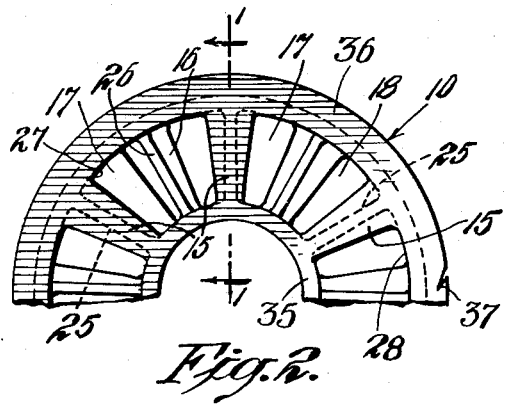
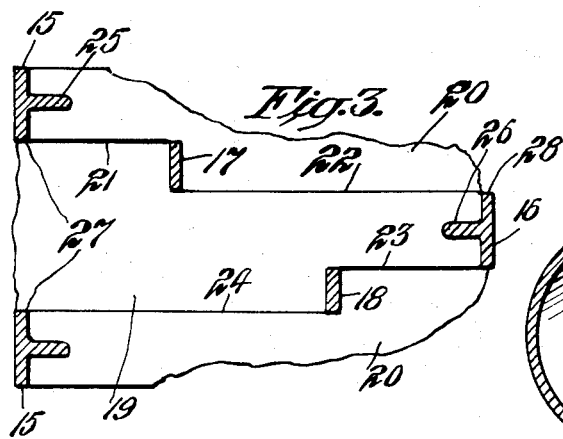
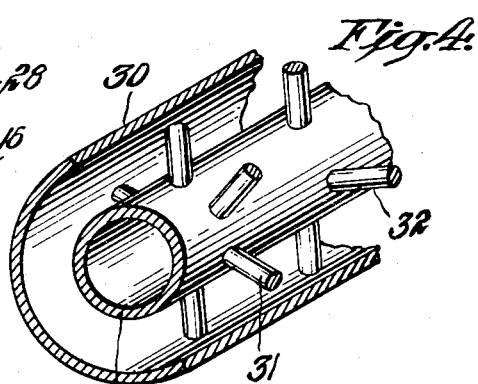
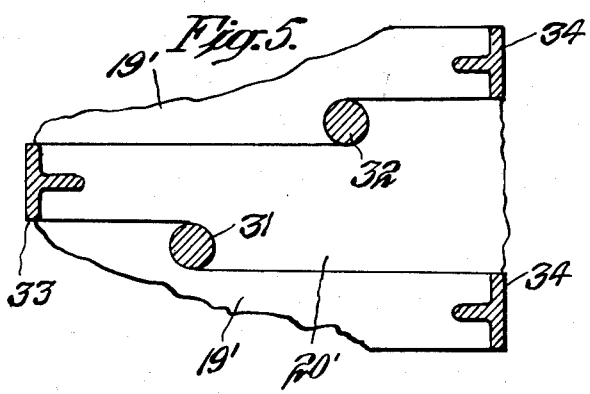
INVENTOR.
LOUIS H. MORIN
BY
ATTORNEY United States Patent Office 2,750,129
Patented June 12, 1956

2,750,129

MOLDED PLASTIC SPOOL

Louis H. Morin, Bronx, N. Y., assignor to Coats & Clark, Inc., New York, N. Y., a corporation of Delaware Application June 22, 1953, Serial No. 363,295

12 Claims. (Cl. 242—119)

This invention relates to what is generally known as thread spools and particularly to a product of this type and kind wherein the spool body is made from molded plastic material. Still more particularly, the invention deals with a spool structure having a plurality of circumferentially spaced and longitudinally arranged spokelike ribs uniting the inner tube with the outer tubular body of the spool structure and for reinforcing the spool intermediate the ends thereof. Still further, the invention deals with a spool structure wherein end wall portions are provided at the ends of the spool adapting the same for mounting of labels thereon, and still further wherein said end wall portions are reinforced by ribs.

The novel features of the invention will be best understood from the following description when taken together with the accompanying drawing, in which certain embodiments of the invention are disclosed, and in which the separate parts are designated by suitable reference characters in each of the views, and in which:

Fig. 1 is a longitudinal sectional view through one form of spool which I employ, the section being on the line 1—1 of Fig. 2;

Fig. 2 is an end view of part of the spool looking in the direction of the arrow 2 of Fig. 1 of the drawing;

Fig. 3 is a diagrammatical view illustrating the relationship of two core members, one with respect to the other, in forming spools of the type illustrated in Figs. 1 and 2, parts of the structure of the spool being diagrammatically shown in section;

Fig. 4 is a perspective sectional view diagrammatically showing another form of construction which I employ; and Fig. 5 is a view similar to Fig. 3 showing the core structure employed in forming spools of the type and kind illustrated in Fig. 4 of the drawing.

In Figs. 1 and 2, I have illustrated one form of spool structure which I employ. In Fig. 3 is a diagrammatic showing of the coring for producing spools as shown in Figs. 1 and 2. At 10 is shown a spool comprising an outer tubular body 11 with rimmed or flanged ends 12 and 13. At 14 I have shown the inner tube or sleeve of the spool which joins the tubular body 11 in end wall portion 15 at one end of the spool and end wall portion 16 at the other end thereof, and also by spoke or rib structures 17 and 18, the latter being circumferentially spaced between the tubular portions 11 and 14 and also spaced longitudinally of the spool body in the manner clearly illustrated in Fig. 1 of the drawing.

It will appear from Fig. 3 of the drawing that the spokes or ribs 17 and 18 are disposed intermediate side edges of the end wall portions 15 and 16 so that core pin 19 disposes between the end wall portions 15 and extends to and partially forms two spokes or ribs 17 and 18 arranged at either side of one of the end wall portions 16, whereas the core pins 20, which are arranged between the end wall portions 16 (only one of which is being shown in Fig. 3) also help to form the spokes or ribs 17 and 18. In other words, the core pins 19 and 20 have meeting and engaging surfaces as at 21, 22, 23 and 24, and similar surfaces continue throughout all of the core pins employed in forming the spool 10 shown in Figs. 1 and 2 of the drawing. It will also appear that the inner surfaces of the end wall portions 15 and 16 have reinforcing ribs 25 and 26, respectively.

From a consideration of Figs. 2 and 3 of the drawing, it will appear that the end wall portions 16 are disposed centrally with respect to the spaces or openings 27 between the end wall portions 15, and in like manner the end wall portions 15 are disposed centrally with respect to the spaces or openings 28 between the end wall portions 16. It will further appear that there are no through openings between adjacent end wall portions, that is to say, on either side edge of an end wall portion there is a spoke 17 or 18 interposed which blocks a longitudinal or through opening from one end of the spool to the other. With this construction, a substantially complete circumferential support is provided between the inner tube or sleeve 14 and the outer tubular body 11, the support being formed of the portions 15, 16 and spokes 17, 18, which portions and spokes are spaced from each other and, in at least portions of the spool, are spaced longitudinally with respect to the spool.

In Figs. 4 and 5 of the drawing, I have diagrammatically shown a modification of the structure shown in Figs. 1 to 3 inclusive, and considering Fig. 4, 29 represents the inner tube or sleeve similar to the tube 14, and 30 the outer tubular body, and instead of the flat ribs or spokes 17 and 18 shown in Figs. 1 to 3, round spokes or ribs 31 and 32 are employed, and these spokes are arranged between end wall portions 33 at one end of the spool and 34 at the other end of the spool in the same manner as the arrangement of the ribs or spokes 17 and 18.

In Fig. 5 I have shown at 19' core fingers which differ from the fingers 19 in simply having rounded surfaces to form the round spokes 31, 32 rather than the flat spokes 17 and 18, and in like manner the core pins 20' which interfit with core pins 19' are correspondingly modified. Otherwise the structure of a spool made in accordance with the teachings in Figs. 4 and 5 of the drawing will be the same as the spool structure shown in Figs. 1 and 2.

It will be apparent that while the spools have been described primarily as being molded from plastic materials, they can be molded or cast from metal, plastics being preferably used from the standpoint of lightness in weight. However, with some types of spools the question of weight would not be a factor. The core structure for producing spools of the type and kind under consideration are more specifically described and claimed in a companion application Ser. No. 363,364, filed June 22, 1953.

To summarize the invention and to call attention to further details, it will be appreciated that the present spool or spools is preferably all plastic. It is made in one piece. Each end wall or face can be considered as comprising the annular end surface of the inner tube (note 35 in Fig. 2), the annular end surface of the flanged tubular body or barrel (note 36 in Fig. 2), and, intermediate said annular surfaces, a group of radially arranged alternate end wall portions and spaces. The end wall portions are in the form of tapered spokes, although they may have other forms. The annular end surfaces of the inner tube and of the flanged barrel lie in the same plane as the outer surfaces of the spokes. Each end face has sufficient surface area sufficiently distributed thereover as to enable ticket labels to be adhered to it. It will be noted that the spokes in one end wall are offset with respect to the spokes in the other end wall so that each spoke in one wall is opposite a space in the other wall, and, further, each spoke in one wall is unconnected to any of the spokes in the other wall except through the inner tube and the outer barrel. The ribs 17, 18 and 31, 32 are intermediate, and spaced from, the ends of the spool.

The spool is provided with a nick 37 which is non-chippable, that is, it is resistant to breaking, in contrast to conventional wood spools.

The spool is particularly adapted for holding sewing thread for domestic use. It is light in weight, averaging about one-third, or less, of the weight of a wood spool, and economizes material. Despite its lightness, it is strong and rigid. It is capable of being produced in large quantities in a smooth, finished condition by a high speed casting operation.

Having fully described my invention, what I claim as new and desire to secure by Letters Patent is:

1. A spool structure of the character described comprising an inner tube, an outer tubular body joining the inner tube at end portions of the spool in circumferentially spaced end wall portions, said end wall portions having flat outer surfaces, said outer tubular body having at the ends of the spool circumferential outwardly extending rims, outer surfaces of the rims being flush with the outer surfaces of the end wall portions of the spool, said end wall portions including inwardly extending ribs, the spool structure having intermediate the end wall members circumferentially spaced apertures, inner and outer tubes of the spool structure being joined intermediate the ends of the spool structure by circumferentially spaced spokes arranged in longitudinal alignment with said apertures, and said inner and outer tubes forming a chamber therebetween which is continuous throughout the length and circumference of said tubes.

2. A spool structure of the character described comprising an inner tube, an outer tubular body joining the inner tube at end portions of the spool in circumferentially spaced end wall portions, said end wall portions having flat outer surfaces, said outer tubular body having at the ends of the spool circumferential outwardly extending rims, outer surfaces of the rims being flush with the outer surfaces of the end wall portions of the spool, said end wall portions including inwardly extending ribs, the spool structure having intermediate the end wall members circumferentially spaced apertures, inner and outer tubes of the spool structure being joined intermediate the ends of the spool structure by circumferentially spaced spokes arranged in longitudinal alignment with said apertures, the spokes being spaced longitudinally of the spool structure, and said inner and outer tubes forming a chamber therebetween which is continuous throughout the length and circumference of said tubes.

3. A spool structure of the character described comprising a tubular body defined by spaced inner and outer tubes integrally joined at their ends in circumferentially spaced end wall members, the ends of the spool structure having circumferential outwardly extending rims integral with the end wall members and forming in conjunction with said end wall members flat end surfaces for attachment of labels thereto, the spacing of the end wall members forming apertures at each end of the spool structure, the end wall members at one end of the spool structure being disposed centrally in alignment with the apertures of the opposed end of the spool structure leaving intermediate both end wall members longitudinal passages extending through the spool structure, and the inner and outer tubes being integrally joined by spokes arranged in alignment with said longitudinal passages of the spool structure.

4. A spool structure of the character described comprising a tubular body defined by spaced inner and outer tubes integrally joined at their ends in circumferentially spaced end wall members, the ends of the spool structure having circumferential outwardly extending rims integral with the end wall members and forming in conjunction with said end wall members flat end surfaces for attachment of labels thereto, the spacing of the end wall members forming apertures at each end of the spool structure, the end wall members at one end of the spool structure being disposed centrally in alignment with the apertures of the opposed end of the spool structure leaving intermediate both end wall members longitudinal passages extending through the spool structure, the inner and outer tubes being integrally joined by spokes arranged in alignment with said longitudinal passages of the spool structure, said spokes being divided into two sets spaced longitudinally of the spool structure, one set of spokes being adjacent one end of the spool structure, and the other set of spokes being adjacent the opposed end of the spool structure.

5. A spool structure of the character described comprising a tubular body defined by spaced inner and outer tubes integrally joined at their ends in circumferentially spaced end wall members, the ends of the spool structure having circumferential outwardly extending rims integral with the end wall members and forming in conjunction with said end wall members flat end surfaces for attachment of labels thereto, the spacing of the end wall members forming apertures at each end of the spool structure, the end wall members at one end of the spool structure being disposed centrally in alignment with the apertures of the opposed end of the spool structure leaving intermediate both end wall members longitudinal passages extending through the spool structure, the inner and outer tubes being integrally joined by spokes arranged in alignment with said longitudinal passages of the spool structure, said spokes being divided into two sets spaced longitudinally of the spool structure, one set of spokes being adjacent one end of the spool and the other set of spokes being adjacent the opposed end of the spool structure, and said spokes being flat in cross sectional form.

6. A spool structure of the character described comprising a tubular body defined by spaced inner and outer tubes integrally joined at their ends in circumferentially spaced end wall members, the ends of the spool structure having circumferential outwardly extending rims integral with the end wall members and forming in conjunction with said end wall members flat end surfaces for attachment of labels thereto, the spacing of the end wall members forming apertures at each end of the spool structure, the end wall members at one end of the spool structure being disposed centrally in alignment with the apertures of the opposed end of the spool structure leaving intermediate both end wall members longitudinal passages extending through the spool structure, the inner and outer tubes being integrally joined by spokes arranged in alignment with said longitudinal passages of the spool structure, said spokes being divided into two sets spaced longitudinally of the spool structure, one set of spokes being adjacent one end of the spool structure, the other set of spokes being adjacent the opposed end of the spool structure, and said spokes being round in cross sectional form.

7. A spool structure of the character described comprising a tubular body defined by spaced inner and outer tubes integrally joined at their ends in circumferentially spaced end wall members, the ends of the spool structure having circumferential outwardly extending rims integral with the end wall members and forming in conjunction with said end wall members flat end surfaces for attachment of labels thereto, the spacing of the end wall members forming apertures at each end of the spool structure, the end wall members at one end of the spool structure being disposed centrally in alignment with the apertures of the opposed end of the spool structure leaving intermediate both end wall members longitudinal passages extending through the spool structure, the inner and outer tubes being integrally joined by spokes arranged in alignment with said longitudinal passages of the spool structure, said spokes being divided into two sets spaced longitudinally of the spool structure, one set of spokes being adjacent one end of the spool structure, the other set of spokes being adjacent the opposed end of the spool structure, and side edges of the spokes being in registering alignment with side edges of end wall members at opposed ends of the spool structure.

8. A spool structure of the character described comprising a tubular body defined by spaced inner and outer tubes integrally joined at their ends in circumferentially spaced end wall members, the ends of the spool structure having circumferential outwardly extending rims integral with the end wall members and forming in conjunction with said end wall members flat end surfaces for attachment of labels thereto, the spacing of the end wall members forming apertures at each end of the spool structure, the end wall members at one end of the spool structure being disposed centrally in alignment with the apertures of the opposed end of the spool structure leaving intermediate both end wall members longitudinal passages extending through the spool structure, the inner and outer tubes being integrally joined by spokes arranged in alignment with said longitudinal passages of the spool structure, side edges of the spokes and side edges of the end wall members being in common longitudinal alignment, and said end wall members having short inwardly extending ribs joining inner and outer tubes at said end wall members.

9. A one-piece all-plastic thread spool comprising an inner tube, an outer thread-holding barrel having flanged ends, and a pair of end walls integrally formed with and connecting the tube and barrel together; each end wall comprising the annular end surface of the tube and the annular end surface of the flanged barrel and also comprising intermediate said annular surfaces a group of alternate end wall portions and spaces, the annular end surfaces of the tube and of the flanged barrel lying in the same plane as the outer surfaces of said portions; each end wall having sufficient surface area sufficiently distributed thereover as to enable labels to be adhered thereto; each of the portions in one end wall being free of attachment to any of the portions in the other end wall except through said tube and barrel; a plurality of longitudinally spaced supporting ribs extending transversely of the spool from the inner tube to the outer barrel, said ribs being disposed intermediate, and spaced from, the end faces of the spool, said ribs being spaced circumferentially of the spool; said tube and barrel forming a chamber therebetween which is continuous throughout their length and circumference; and a non-chippable thread-holding nick in the periphery of one of said flanged ends.

10. A thread spool comprising an inner tube, an outer thread-holding barrel having flanged ends, and a pair of end walls integrally formed with and connecting the tube and barrel together; each end wall comprising the annular end surface of the tube and the annular end surface of the flanged barrel and also comprising intermediate said annular surfaces a group of alternate end wall portions and spaces, each end wall having sufficient surface area sufficiently distributed thereover as to enable labels to be adhered thereto; each of the portions in one end wall being free of attachment to any of the portions in the other end wall except through said tube and barrel; a plurality of longitudinally spaced spoke-like supporting ribs extending transversely of the spool from the inner tube to the outer barrel, said ribs being disposed intermediate, and spaced from, the end faces of the spool; said tube and barrel forming a chamber therebetween which is continuous throughout their length and circumference; and a non-chippable thread-holding nick in the periphery of one of said flanged ends.

11. A one-piece all-plastic thread spool comprising an inner tube, an outer thread-holding barrel having flanged ends, and a pair of end walls integrally formed with and connecting the tube and barrel together; each end wall comprising the annular end surface of the tube and the annular end surface of the flanged barrel and also comprising intermediate said annular surfaces a group of radially arranged alternate spokes and spaces extending from the tube to the flanged end of the barrel, the spokes in one end wall being offset with respect to the spokes in the other end wall so that each spoke in one wall is in substantial alignment with a space in the other wall, each of the spokes in said one wall being unconnected to any of the spokes in the other end wall, each spoke being tapered from its outer to its inner end, each spoke having centrally disposed on its inner surface a strengthening rib extending from the tube to the barrel and spaced from the opposite end wall; the annular end surfaces of the tube and of the flanged barrel lying in the same plane as the outer surfaces of said spokes; each end wall having sufficient surface area sufficiently distributed thereover as to enable labels to be adhered thereto; a plurality of longitudinally spaced supporting ribs extending transversely of the spool from the inner tube to the outer barrel, said ribs being disposed intermediate, and spaced from, the end faces of the spool, said ribs being spaced circumferentially of the spool; and a non-chippable thread-holding nick in the periphery of one of said flanged ends.

12. A one-piece all-plastic thread spool comprising an inner tube, an outer thread-holding barrel having flanged ends, and a pair of end walls integrally formed with and connecting the tube and barrel together; each end wall comprising a group of alternate end wall portions and spaces, the portions in each end wall having flat outer surfaces all lying in the same plane as said end wall and together providing sufficient surface area sufficiently distributed thereover as to enable an end ticket label to be adhered thereto; a plurality of transversely extending spokelike supporting ribs between the tube and barrel spaced both longitudinally and circumferentially of the spool; and said spool having a space intermediate the tube and barrel which is continuous throughout the length and circumference thereof.

References Cited in the file of this patent

UNITED STATES PATENTS

| | | |
|---|---|---|
| 687,562 | Hendrick | Nov. 26, 1901 |
| 1,985,742 | Rea | Dec. 25, 1934 |
| 2,264,116 | Howsam | Nov. 25, 1941 |
| 2,465,573 | Brannon | Mar. 29, 1949 |

FOREIGN PATENTS

| | | |
|---|---|---|
| 24,868 | Great Britain | June 10, 1909 |